United States Patent
Jorgenson et al.

(10) Patent No.: US 7,577,412 B2
(45) Date of Patent: Aug. 18, 2009

(54) SYSTEM AND METHOD FOR DETECTING NARROW BANDWIDTH SIGNAL CONTENT TO DETERMINE CHANNEL OCCUPANCY

(75) Inventors: John Jorgenson, Cedar Rapids, IA (US); David Eastburn, Cedar Rapids, IA (US); Hunter Leland, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 507 days.

(21) Appl. No.: 11/318,348

(22) Filed: Dec. 23, 2005

(65) Prior Publication Data

US 2007/0149155 A1 Jun. 28, 2007

(51) Int. Cl.
*H04B 17/00* (2006.01)

(52) U.S. Cl. .............. 455/226.1; 455/67.11; 455/182.1; 455/266

(58) Field of Classification Search ... 455/182.1–186.1, 455/226.1–226.4, 67.11–67.14
See application file for complete search history.

(56) References Cited

U.S. PATENT DOCUMENTS

| | | | | |
|---|---|---|---|---|
| 5,077,834 A | * | 12/1991 | Andros et al. ............ | 455/193.1 |
| 5,574,995 A | * | 11/1996 | Masaki .................... | 455/161.2 |
| 5,731,699 A | * | 3/1998 | O'Byrne .................. | 455/67.11 |
| 6,304,756 B1 | * | 10/2001 | Hebeler et al. ............. | 455/450 |
| 6,591,091 B1 | * | 7/2003 | Vorenkamp et al. ...... | 455/179.1 |
| 6,639,541 B1 | * | 10/2003 | Quintana et al. ......... | 455/226.4 |
| 7,099,638 B2 | * | 8/2006 | Lyons et al. ............. | 455/166.1 |
| 2004/0116087 A1 | * | 6/2004 | Shen ........................ | 455/130 |
| 2004/0142696 A1 | * | 7/2004 | Saunders et al. ........... | 455/450 |
| 2007/0019603 A1 | * | 1/2007 | Gerhardt et al. ............ | 370/343 |
| 2007/0082639 A1 | * | 4/2007 | Lindstrom et al. ....... | 455/226.3 |

FOREIGN PATENT DOCUMENTS

GB 2258108 A * 1/1993

* cited by examiner

*Primary Examiner*—Lana N Le
(74) *Attorney, Agent, or Firm*—Kinney & Lange, P.A.

(57) ABSTRACT

A system and method for detecting the presence of a signal on a channel mixes signals received with an antenna with a local signal having a controllable frequency within a band of frequencies defined by the channel. The local signal is produced with a sequentially adjusted frequency within the channel. The mixing operation (for each local signal frequency) produces an output signal having a frequency indicative of a difference between a frequency of signals received with the antenna and a frequency of the local signal. The output signal is converted to a baseband frequency band, and is then analyzed to determine whether the signals received with the antenna occupy the channel.

16 Claims, 6 Drawing Sheets

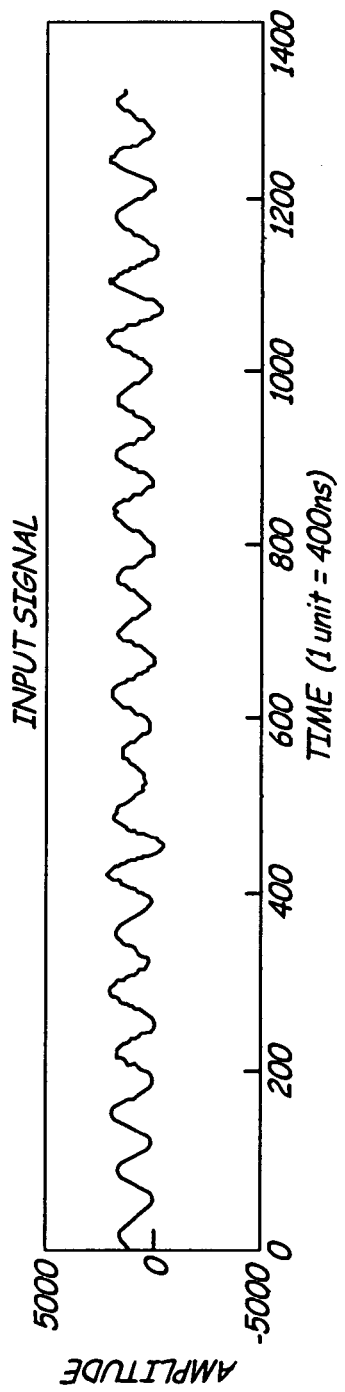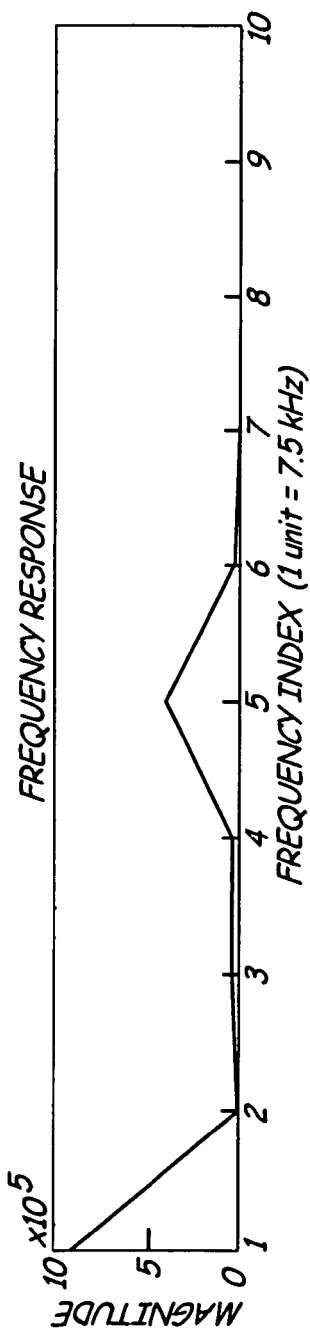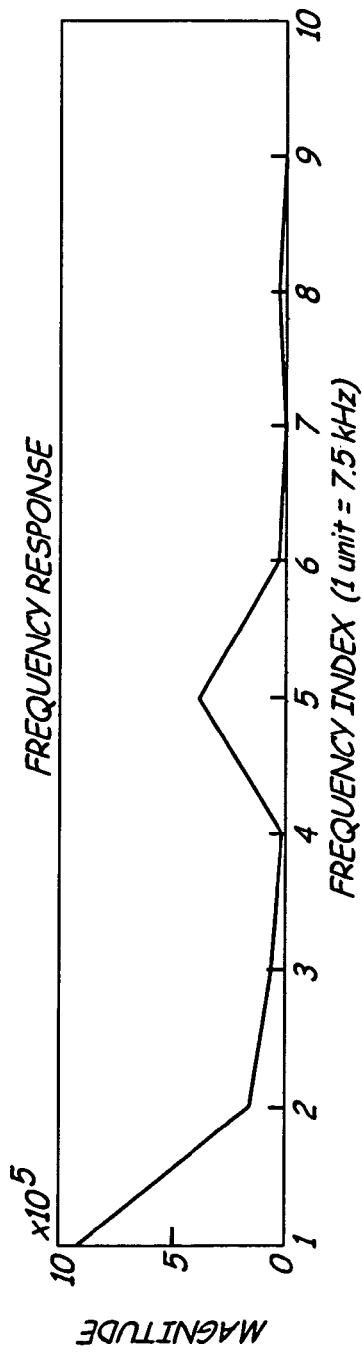
Fig. 4A
Fig. 4B
Fig. 4C

SYSTEM AND METHOD FOR DETECTING NARROW BANDWIDTH SIGNAL CONTENT TO DETERMINE CHANNEL OCCUPANCY

BACKGROUND OF THE INVENTION

The present invention relates to a system and method of detecting channel occupancy, such as in a listen-before-talk (LBT) communication protocol.

In many communication systems, a transceiver of a device follows an LBT protocol to ensure that a communication channel is clear before transmitting on the channel. In typical systems that employ communication channels having a relatively wide bandwidth, devices employ a transceiver that has the ability to detect a signal that is present anywhere within the channel bandwidth. The sensitivity of the transceiver is also typically quite high, to ensure that any signal that might be present on the channel is detected. As a result of the performance characteristics that are required, transceivers in typical systems can be quite expensive to implement, and can result in detection of false positives due to their high sensitivity across the entire channel bandwidth.

An improved system and method for detecting the presence of signals on a communication channel would be a useful advance in the state of the art.

BRIEF SUMMARY OF THE INVENTION

The present invention is a system and method for detecting the presence of a signal on a channel. Signals received with an antenna are mixed with a local signal having a controllable frequency within a band of frequencies defined by the channel. The local signal is produced with a sequentially adjusted frequency within the channel. The mixing operation (for each local signal frequency) produces a baseband output signal having a frequency indicative of a difference between a frequency of signals received with the antenna and a frequency of the local signal. The output signal is analyzed to determine whether the signals received with the antenna occupy the channel.

BRIEF DESCRIPTION OF THE DRAWINGS

FIGS. 3A-3C, 4A-4C, 5A-5C and 6A-6C are graphs illustrating the frequency response of a receiver according to the present invention to various input signals.

DETAILED DESCRIPTION

Figure 1:
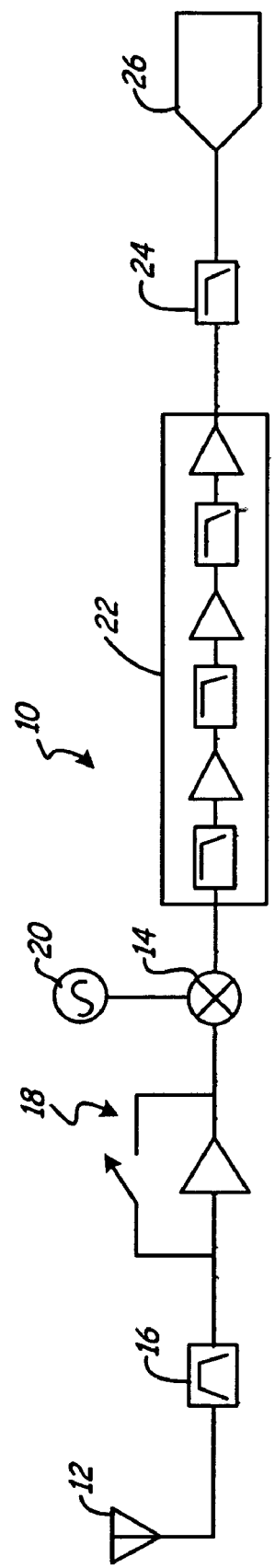
FIG. 1 is a diagram illustrating the functional components of a receiver for detecting the presence of a signal on a channel in accordance with the present invention.

FIG. 1 is a diagram illustrating the functional components of receiver 10 for detecting the presence of a signal on a channel in accordance with the present invention. Antenna 12 is provided to receive signals, and is coupled to frequency mixer 14. Antenna 12 is coupled to frequency mixer 14 through optional front end filter 16 and optional low noise amplifier (LNA) 18 in some embodiments. Local oscillator 20 is connected to frequency mixer 14, and is controllable to provide an output at a number of frequencies. Frequency mixer 14 is connected to baseband circuitry 22, which amplifies and filters the baseband signal output by frequency mixer 14. Baseband filter 24, which may be fixed or adjustable, is connected to baseband circuitry 22, and the output of baseband filter 24 is connected to tone detector 26. Tone detector 26 may be an analog or digital tone detector circuit, or may include an analog-to-digital converter (ADC) and a digital signal processor (DSP) for performing an algorithm such as a Goertzel algorithm or a fast Fourier transform (FFT) algorithm. All of these tone detecting techniques are known and well understood in the art.

In operation, receiver 10 receives signals via antenna 12. In embodiments that include front end filter 16, the received signal is filtered to pass only signals of interest. Furthermore, in embodiments that include LNA 18, the signal is amplified as well. The received signal is input to frequency mixer 14, which mixes the incoming signal with a signal produced by local oscillator 20, producing a baseband signal having a frequency indicative of the difference between the frequency of the incoming signal and the signal produced by local oscillator 20. The difference signal is amplified and filtered by baseband circuitry 22 (which includes low pass filter and amplifier components), and is then filtered by baseband filter 24. This process eliminates the high frequency signals from the output of frequency mixer 14, so that low frequency signals (indicative of an incoming signal having a frequency that nearly matches the frequency of local oscillator 20) are isolated. Tone detector 26 receives the filtered signal from baseband filter 24 and determines whether a signal matching the frequency of the signal produced by local oscillator 20 has been detected. In this way, receiver 10 is able to detect the presence of a signal in a particular frequency band of a communication channel.

Figure 2:
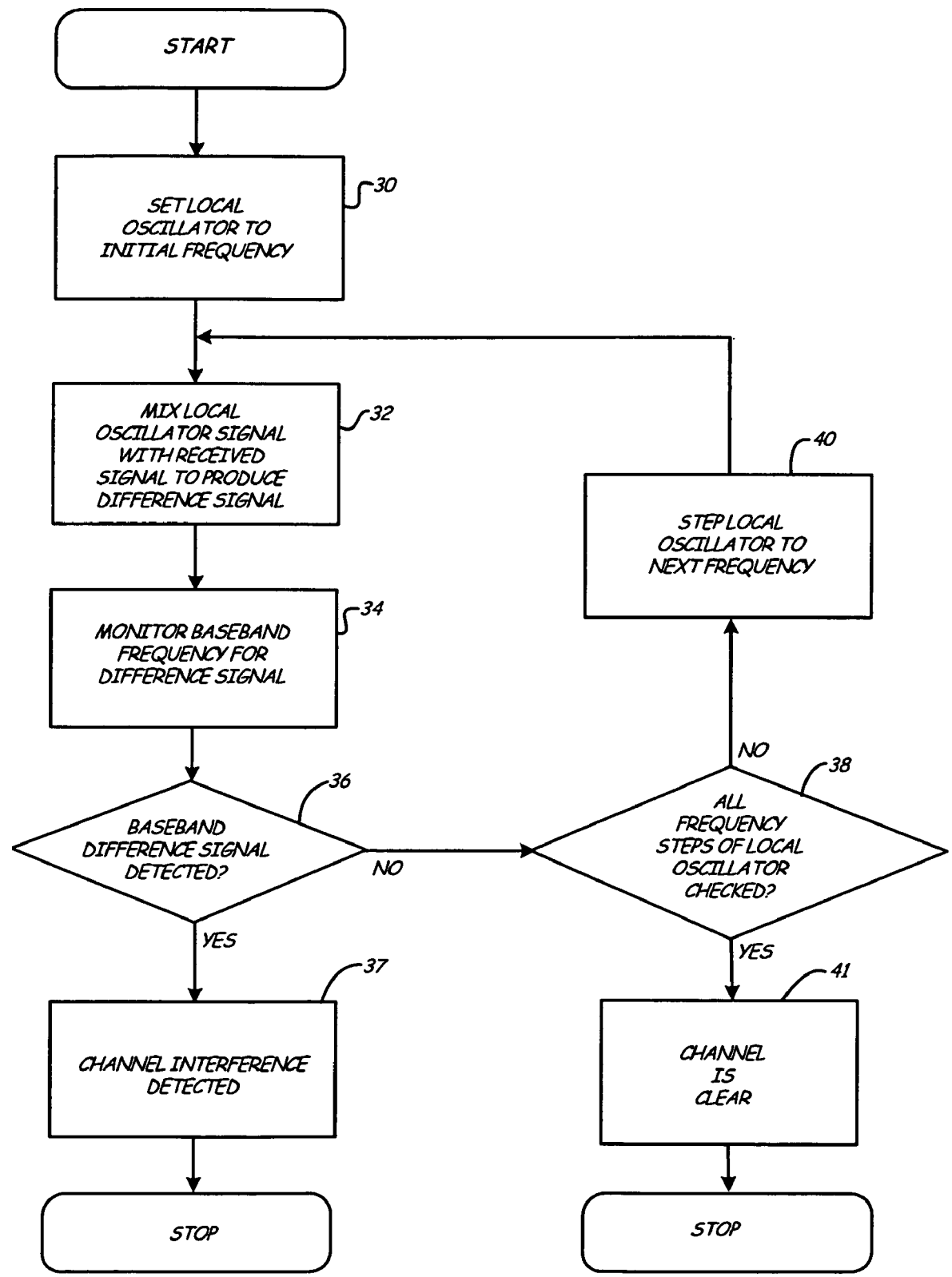
FIG. 2 is a flow diagram illustrating a method of operating a receiver to detect the presence of an interfering signal on a wideband communication channel.

FIG. 2 is a flow diagram illustrating a method of operating a receiver (such as receiver 10 shown in FIG. 1) to detect the presence of an interfering signal on a wideband communication channel. The steps shown in the flow diagram of FIG. 2 will be explained with respect to operation of the components shown in FIG. 1 (and referred to by reference number). Local oscillator 20 is set to an initial frequency (step 30), and the signal produced by local oscillator 20 is mixed by frequency mixer 14 with the signal received from antenna 12 to produce a difference signal (step 32). A baseband frequency range is then monitored (i.e., by ADC 26) to determine whether the difference signal is present in the baseband frequency range (step 34). If a baseband difference signal is detected (step 36), it is concluded that channel interference is present (step 37). If a baseband difference signal is not detected (step 36), the system determines whether all of the local oscillator frequencies within the range of channel frequencies have been checked (step 38). For example, a system may be configured to check for interference signals at a frequency below the center frequency of the channel, at a frequency above the center frequency of the channel, and at the center frequency of the channel. Other configurations may also be used. If not all local oscillator frequencies (that is, all of the frequencies that local oscillator 20 is configured to step through) have been checked, local oscillator 20 is stepped to the next frequency to be checked (step 40), and the local oscillator signal is again mixed with the signal received from antenna 12 to produce a difference signal (step 32). If all local oscillator frequencies have been checked, and no interference has been detected, it is concluded that the channel is clear (step 41).

Figure 3A:
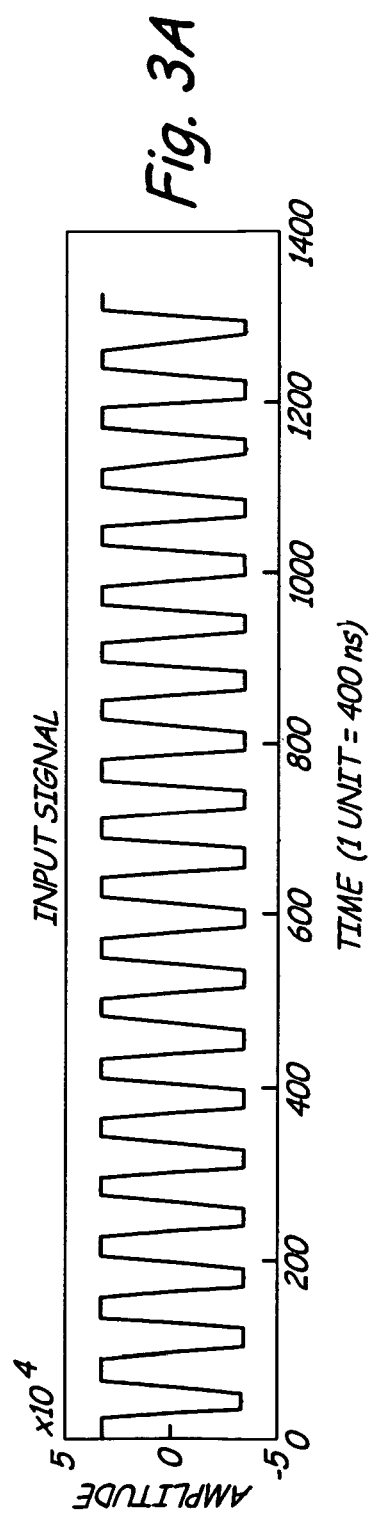
Figure 3B:
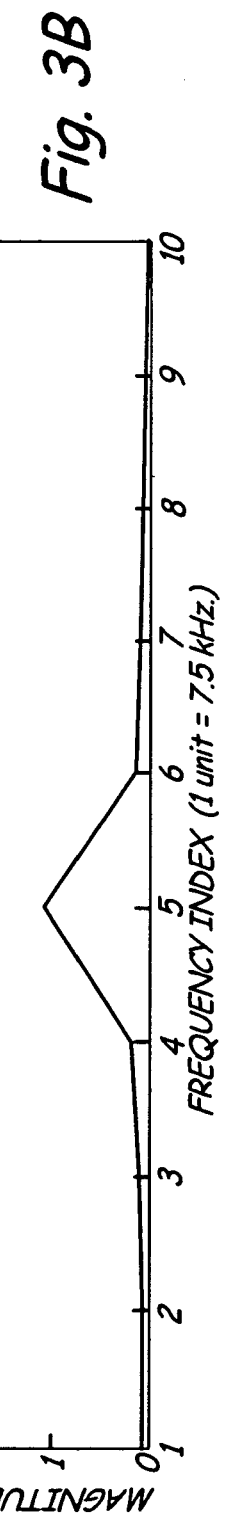
Figure 3C:
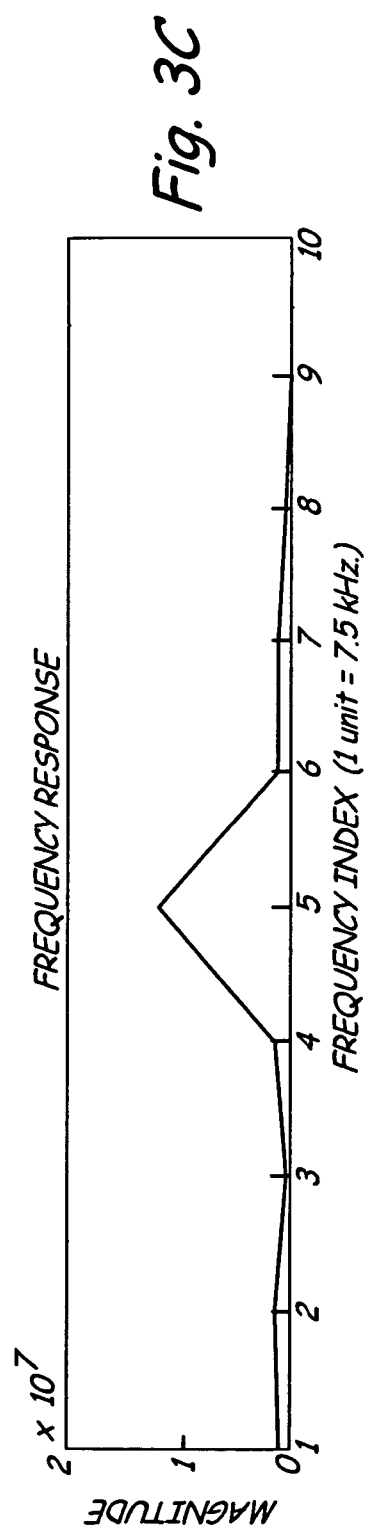

FIGS. 3A-3C are graphs illustrating the response of a Goertzel tone detector (employed as element 26 shown in FIG. 1) to an input signal (received on antenna 10 shown in FIG. 1) at the center channel frequency having a power level of −55 dBm, with local oscillator 20 (shown in FIG. 1) having a frequency that is offset from the center channel frequency by −37.5 kHz. FIG. 3A is a graph of the input signal, FIG. 3B is a graph of the frequency response of a MATLAB® generated Goertzel tone detector algorithm, and FIG. 3C is a graph of the frequency response of a Simulink® generated tone detector algorithm (MATLAB® and Simulink® are both commercially available mathematical modeling software packages). As shown in the graphs of FIGS. 3B and 3C, the frequency index labeled "5" (which corresponds to detection of a signal offset from the local oscillator frequency by 37.5 kHz) has a magnitude of $1 \times 10^7$ units, indicating the presence of a signal at this frequency.

FIGS. 4A-4C are graphs illustrating the response of a Goertzel tone detector (employed as element 26 shown in FIG. 1) to an input signal (received on antenna 10 shown in FIG. 1) at the center channel frequency having a power level of −96 dBm, with local oscillator 20 (shown in FIG. 1) having a frequency that is offset from the center channel frequency by −37.5 kHz. FIG. 4A is a graph of the input signal, FIG. 4B is a graph of the frequency response of a MATLAB® generated Goertzel tone detector algorithm, and FIG. 4C is a graph of the frequency response of a Simulink® generated tone detector algorithm. As shown in the graphs of FIGS. 4B and 4C, the frequency index labeled "5" (which corresponds to detection of a signal offset from the local oscillator frequency by 37.5 kHz) has a magnitude of $4 \times 10^5$ units, indicating the presence of a signal at this frequency.

Figure 5A:
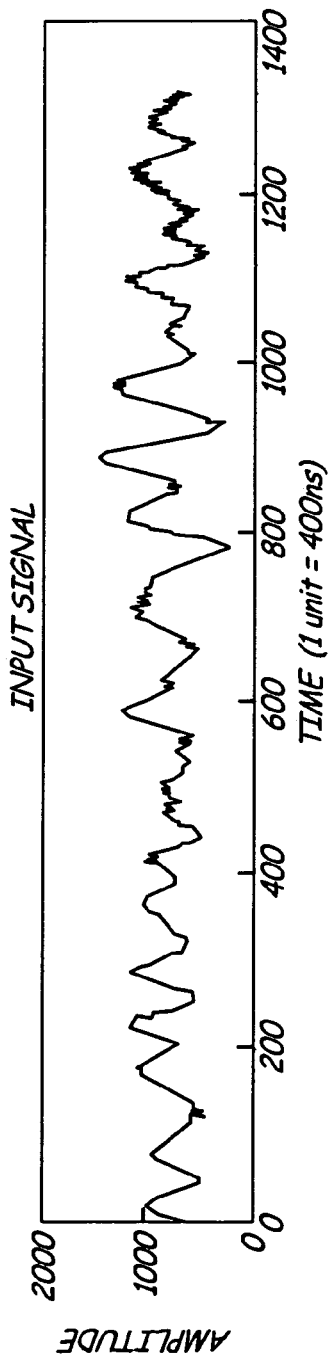
Figure 5B:
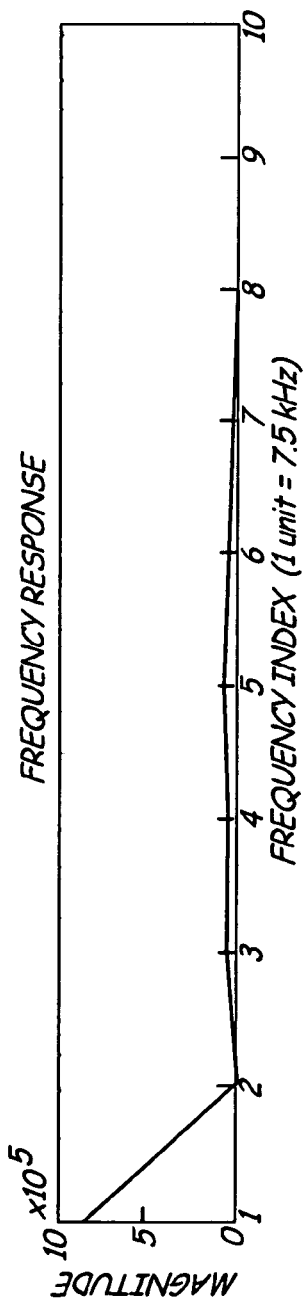
Figure 5C:
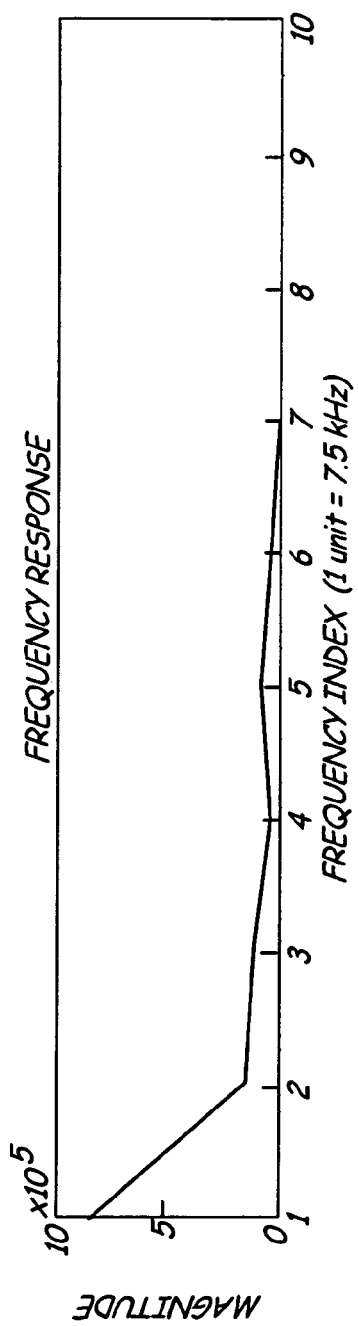

FIGS. 5A-5C are graphs illustrating the response of a Goertzel tone detector (employed as element 26 shown in FIG. 1) to an input signal (received on antenna 10 shown in FIG. 1) at the center channel frequency having a power level of −105 dBm, with local oscillator 20 (shown in FIG. 1) having a frequency that is offset from the center channel frequency by −37.5 kHz. The −105 dBm level of the input signal is below the required sensitivity of the system. FIG. 5A is a graph of the input signal, FIG. 5B is a graph of the frequency response of a MATLAB® generated Goertzel tone detector algorithm, and FIG. 5C is a graph of the frequency response of a Simulink(& generated tone detector algorithm. As shown in the graphs of FIGS. 5B and 5C, the frequency index labeled "5" (which corresponds to detection of a signal offset from the local oscillator frequency by 37.5 kHz) has a magnitude of less than $1 \times 10^5$ units, providing only a slight indication of the presence of a signal at this frequency.

Figure 6A:
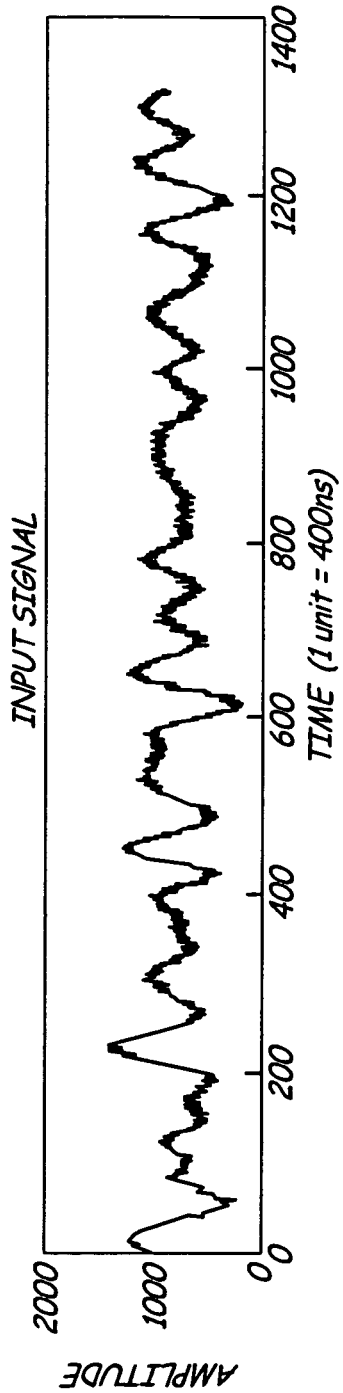
Figure 6B:
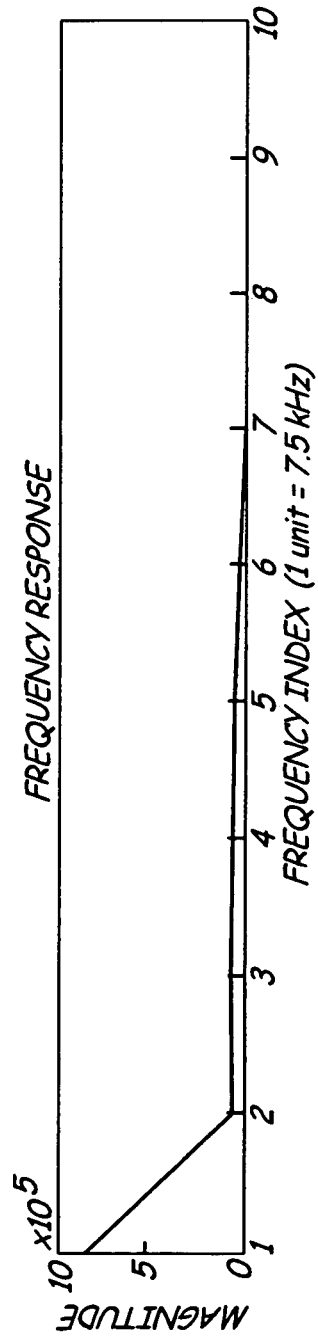
Figure 6C:
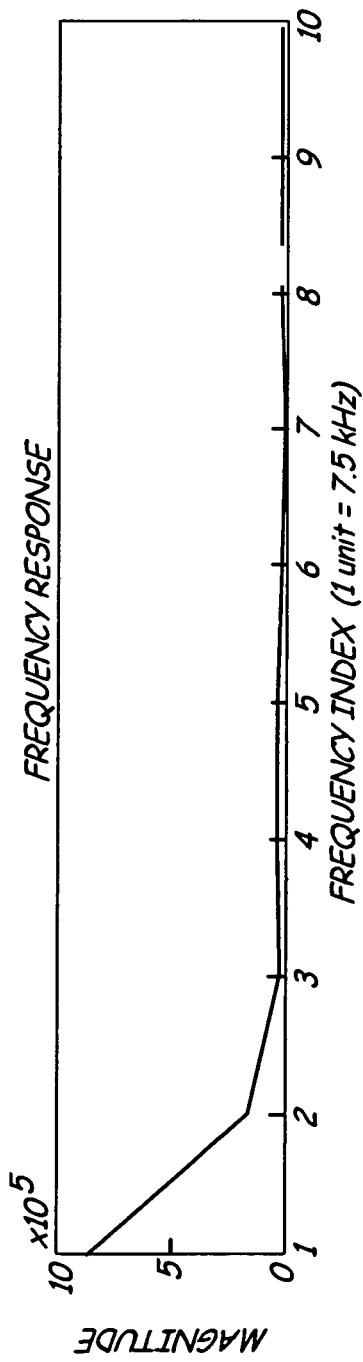

FIGS. 6A-6C are graphs illustrating the response of a Goertzel tone detector (employed as element 26 shown in FIG. 1) to no input signal (received on antenna 10 shown in FIG. 1). FIG. 6A is a graph of the input signal (which is essentially just random noise), FIG. 6B is a graph of the frequency response of a MATLAB® generated Goertzel tone detector algorithm, and FIG. 6C is a graph of the frequency response of a Simulink® generated tone detector algorithm. As shown in the graphs of FIGS. 6B and 6C, the frequency index labeled "5" (which corresponds to a frequency offset from the local oscillator frequency by 37.5 kHz) has no indication of a signal at this frequency, illustrating that the tone detector does not detect a false positive when no signal is present.

In application, the tone detector utilized in the receiver system of the present invention will be calibrated so that magnitudes of input signals above a threshold will be interpreted as interfering signals, while magnitudes of input signals below the threshold will be interpreted as a clear channel.

The stepped narrowband frequency approach of listening for interference on a wideband communication channel provides savings in both the cost and the complexity of the receiver. In prior systems, listening for interference on a wideband channel required a receiver that was highly sensitive to any signals within the communication channel bandwidth. When the channel bandwidth is wide, this is an expensive piece of equipment. The stepped approach offered by the present invention allows a receiver to be sensitive to a narrow bandwidth of signals at a time, which is much less expensive to implement.

Although the present invention has been described with reference to preferred embodiments, workers skilled in the art will recognize that changes may be made in form and detail without departing from the spirit and scope of the invention.

The invention claimed is:

1. A receiver system for detecting the presence of a signal on a channel, comprising:
   an antenna;
   a local oscillator having an output with a controllable frequency within a band of frequencies defined by the channel;
   a frequency mixer connected to receive signals from the antenna and the local oscillator as inputs, and to output a baseband signal having a frequency indicative of a difference between a frequency of signals from the antenna and a frequency of signals from the local oscillator; and
   a tone detector coupled to the frequency mixer to determine whether the signals received by the antenna are less than a threshold frequency apart from the frequency of the local oscillator output, the threshold frequency being less than a bandwidth of the band of frequencies defined by the channel.

2. The receiver system of claim 1, wherein the local oscillator output is controllable to step through a plurality of frequencies within the band of frequencies defined by the channel.

3. The receiver system of claim 1, further comprising:
   a front end filter coupled between the antenna and the frequency mixer.

4. The receiver system of claim 1, further comprising:
   a low noise amplifier coupled between the antenna and the frequency mixer.

5. The receiver system of claim 1, further comprising:
   baseband circuitry coupled between the frequency mixer and the tone detector for amplifying and filtering the output signal.

6. The receiver system of claim 1, wherein the tone detector comprises an analog tone detector circuit.

7. The receiver system of claim 1, wherein the tone detector comprises a digital tone detector circuit.

8. The receiver system of claim 1, wherein the tone detector comprises an analog-to-digital converter (ADC).

9. The receiver system of claim 1, wherein the tone detector further comprises a digital signal processor (DSP) performing a Goertzel algorithm to determine the presence of a signal that is less than a threshold frequency apart from the frequency of the local oscillator output.

10. The receiver system of claim 1, wherein the tone detector further comprises a digital signal processor (DSP) performing a fast Fourier transform (FFT) algorithm to determine the presence of a signal that is less than a threshold frequency apart from the frequency of the local oscillator output.

11. A method of detecting the presence of a signal on a channel, comprising:
   receiving signals with an antenna;
   producing a local signal having a controllable frequency within a band of frequencies defined by the channel, and sequentially adjusting the frequency of the local signal within the channel;
   mixing the signals received with the antenna with the local signal to produce a baseband output signal having a frequency indicative of a difference between a frequency of the signals received with the antenna and a frequency of the local signal; and analyzing the output signal to determine whether the signals received with the antenna occupy the channel, including determining the presence of a signal that is less than a threshold frequency apart from the frequency of the local signal via a tone detector, the threshold frequency being less than a bandwidth of the band of frequencies defined by the channel.

12. The method of claim 11, wherein analyzing the output signal to determine whether the signals received with the antenna occupy the channel comprises:

performing a Goertzel algorithm on the output signal to determine the presence of the signal that is less than the threshold frequency apart from the frequency of the local signal, the threshold frequency being less than the bandwidth of the band of frequencies defined by the channel.

13. The method of claim 11, wherein analyzing the output signal to determine whether the signals received with the antenna occupy the channel comprises:

performing a fast Fourier transform (FFT) algorithm on the output signal to determine the presence of the signal that is less than the threshold frequency apart from the frequency of the local signal, the threshold frequency being less than the bandwidth of the band of frequencies defined by the channel.

14. The method of claim 11, further comprising:
filtering the signals received with the antenna prior to the step of mixing.

15. The method of claim 11, further comprising:
amplifying the signals received with the antenna prior to the step of mixing.

16. The method of claim 11, further comprising:
amplifying and filtering the output signal prior to the analyzing the output signal.

* * * * *

UNITED STATES PATENT AND TRADEMARK OFFICE
CERTIFICATE OF CORRECTION

PATENT NO. : 7,577,412 B2  Page 1 of 1
APPLICATION NO. : 11/318348
DATED : August 18, 2009
INVENTOR(S) : Jorgenson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Seventh Day of September, 2010

David J. Kappos
*Director of the United States Patent and Trademark Office*